United States Patent
Lesnau, IV et al.

(10) Patent No.: US 8,833,771 B2
(45) Date of Patent: Sep. 16, 2014

(54) GASKET ASSEMBLY WITH IMPROVED LOCATING AND RETENTION PIN AND METHOD OF CONSTRUCTION THEREOF

(75) Inventors: Edward Lesnau, IV, Livonia, MI (US); Ron M. Noteboom, Armada, MI (US); Christopher John Lafrenz, Shelby Township, MI (US); John Sas, Grayslake, IL (US)

(73) Assignee: Federal-Mogul Corporation, Southfield, MI (US)

( * ) Notice: Subject to any disclaimer, the term of this patent is extended or adjusted under 35 U.S.C. 154(b) by 716 days.

(21) Appl. No.: 12/972,907

(22) Filed: Dec. 20, 2010

(65) Prior Publication Data

US 2011/0148049 A1 Jun. 23, 2011

Related U.S. Application Data

(60) Provisional application No. 61/287,848, filed on Dec. 18, 2009.

(51) Int. Cl.
*F02F 11/00* (2006.01)
*F16J 15/08* (2006.01)
*F16J 15/06* (2006.01)
*F16J 15/12* (2006.01)

(52) U.S. Cl.
CPC ...... *F16J 15/0818* (2013.01); *F16J 2015/0868* (2013.01); *F16J 2015/085* (2013.01); *F16J 2015/0856* (2013.01); *F16J 15/121* (2013.01); *F16J 15/122* (2013.01); *F16J 15/0812* (2013.01); *F16J 15/061* (2013.01)

USPC ............................................ 277/591; 277/651

(58) Field of Classification Search
CPC ....... F16J 15/0812; F16J 15/12; F16J 15/121; F16J 15/0818
USPC ......... 277/591, 598, 628, 630, 637, 644, 650, 277/651
See application file for complete search history.

(56) References Cited

U.S. PATENT DOCUMENTS

| 3,618,443 | A | * | 11/1971 | Fitzner | 411/352 |
| 5,267,740 | A | | 12/1993 | Stritzke | |
| 5,716,051 | A | * | 2/1998 | Cornea et al. | 277/609 |
| 6,609,717 | B2 | * | 8/2003 | Hinson | 277/598 |
| 6,676,135 | B2 | * | 1/2004 | Carey | 277/594 |
| 7,175,183 | B2 | * | 2/2007 | Des Places et al. | 277/598 |

(Continued)

FOREIGN PATENT DOCUMENTS

DE 102007020160 A1 10/2008

*Primary Examiner* — Vishal Patel
(74) *Attorney, Agent, or Firm* — Robert L. Stearns; Dickinson Wright, PLLC

(57) ABSTRACT

A gasket assembly and method of construction is provided. The assembly includes a carrier body having opposite planar surfaces with at least one media-conveying opening extending through the planar surfaces with at least one through opening spaced radially from the at least one media-conveying opening. Further, the carrier body has at least one projection formed of the material of the carrier body. The at least one projection extends from the at least one through opening outwardly from at least one of the planar surfaces. The assembly further includes an elastomeric material encapsulating the projection.

17 Claims, 6 Drawing Sheets

(56) References Cited

U.S. PATENT DOCUMENTS

| | | |
|---|---|---|
| 7,302,925 B2 | 12/2007 | Roberts et al. |
| 7,306,235 B2 | 12/2007 | Roberts et al. |
| 7,401,404 B2 | 7/2008 | Yetter et al. |
| 2004/0145121 A1 | 7/2004 | Faurien |
| 2005/0044689 A1* | 3/2005 | Yetter et al. .................. 29/469.5 |
| 2006/0066061 A1 | 3/2006 | Hosokawa |
| 2006/0191137 A1 | 8/2006 | Walz |
| 2008/0290609 A1 | 11/2008 | Seibert |

* cited by examiner

FIG. 7
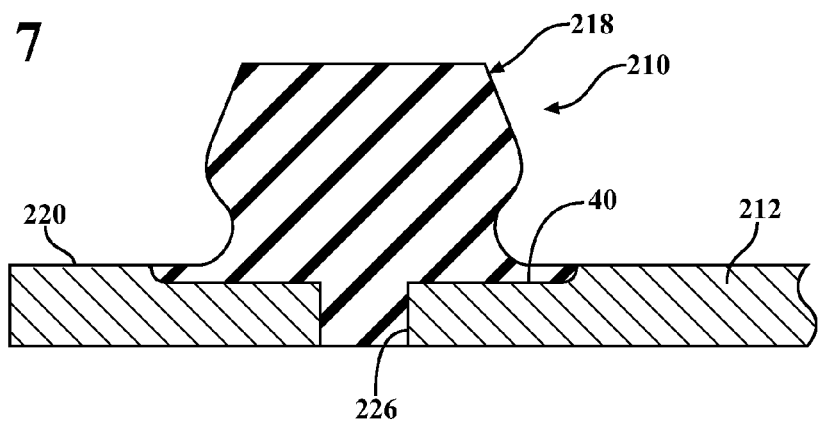
FIG. 8
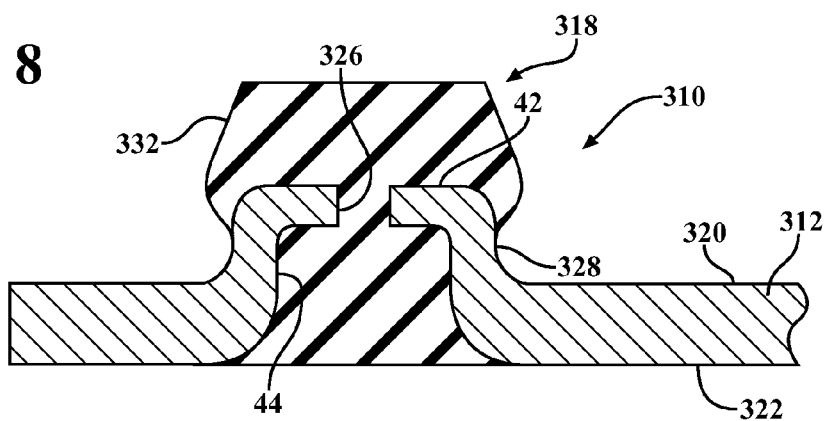
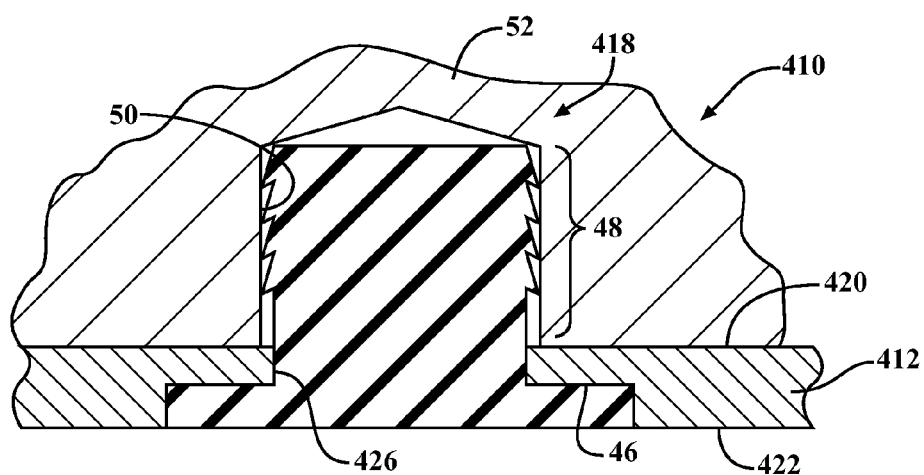
FIG. 9

GASKET ASSEMBLY WITH IMPROVED LOCATING AND RETENTION PIN AND METHOD OF CONSTRUCTION THEREOF

CROSS-REFERENCE TO RELATED APPLICATION

This application claims the benefit of U.S. Provisional Application Ser. No. 61/287,848, filed Dec. 18, 2009, which is incorporated herein by reference in its entirety.

BACKGROUND OF THE INVENTION

1. Technical Field

This invention relates generally to gaskets used to establish a seal between two members clamped together, and more particularly to such gaskets having location features received between the members being clamped together.

2. Related Art

It is known to use gaskets between members being clamped together to facilitate forming a reliable seal between the members being clamped together. It is further known to incorporate locating features on the gasket to facilitate properly orienting the gasket between the members being clamped. As shown in FIGS. 1A-1C, a portion of a gasket assembly 1 constructed in accordance with the known art is illustrated. The gasket assembly 1 has a metal gasket layer, referred to hereafter as carrier 2 and a rubber locating feature 3 attached to the carrier 2. The carrier 2 has opposite, planar sealing surfaces 4, 5 with a through opening 6 extending straight through the carrier 2, thereby extending through the opposite sealing surfaces 4, 5. The rubber locating feature 3 is molded as a separate piece of material from the metal carrier 2 in the through opening 6. The locating feature 3 is molded having a bottom surface 7 configured coplanar with the bottom sealing surface 5 so as to inhibit affecting the ability to form a reliable seal when the gasket assembly 1 is compressed between the members being clamped together. Further, the locating feature 3 has an upstanding projection 8 extending upwardly from the upper sealing surface 4. The upstanding projection 8 is configured for receipt in an opening in one of the members being clamped (not shown). Accordingly, when the upstanding projection 8 is received in the opening of the member being clamped, the gasket 10 is theoretically assured of being in the proper orientation between the members being clamped, thereby providing added assurance that a reliable seal is being established between the members being clamped together by the gasket assembly 1.

Unfortunately, as illustrated in FIGS. 1B and 1C, during assembly of the gasket assembly 1 between the members being clamped, a vertical force component $F_V$ (FIG. 1B) and/or a lateral force component $F_L$, (FIG. 1C) can deflect the locating feature 3 in an undesirable manner, thereby having a potentially negative affect on the ability to properly orient the gasket assembly 1 during assembly. Accordingly, if the gasket assembly 1 is improperly located (i.e. shifted relative to the members being clamped) during assembly, the integrity of the seal formed between the members may be compromised. As can be seen in FIG. 1B, the vertical force component $F_V$ can cause the locating feature 3 to become compressed axially such that the bottom surface 7 extends below the sealing surface 5 of the carrier 2, which in turn can impact the ability to form a reliable seal. In addition, as shown in FIG. 1C, the lateral force component $F_L$ can cause the locating feature 3 to become skewed laterally such that the upstanding portion 8 becomes misaligned relative to a central axis 9 of the through opening 6. Further, the lateral force component $F_L$ can cause at least a portion of the bottom surface 7 to extend below the sealing surface 5 of the carrier 2, both of which can adversely impact the ability to form a reliable seal.

SUMMARY OF THE INVENTION

A gasket assembly includes a carrier body having opposite planar surfaces with at least one media-conveying opening extending through the planar surfaces with at least one through opening spaced radially from the at least one media-conveying opening. Further, the carrier body has at least one projection formed of the material of the carrier body. The at least one projection extends from the at least one through opening outwardly from at least one of the planar surfaces. The assembly further includes an elastomeric material encapsulating the projection.

In accordance with another aspect of the invention, a gasket assembly includes a carrier body having opposite planar surfaces with at least one media-conveying opening extending between the opposite planar surfaces. At least one recessed surface extends into one of the opposite planar surfaces in spaced relation from the at least one media-conveying opening. The carrier body further includes a through opening extending through the at least one recessed surface. The assembly further includes a projection extending outwardly from one of the opposite planar surfaces, wherein the projection is constructed of an elastomeric material substantially filling the recessed surface.

In accordance with another aspect of the invention, a method of constructing a gasket assembly is provided. The method includes providing a metal carrier body having opposite planar surfaces and forming at least one media-conveying opening extending between the planar surfaces. Further, forming at least one through opening extending between the planar surfaces in radially spaced relation from the media-conveying opening. In addition, forming a metal projection extending from the through opening outwardly from at least one of the planar surfaces. Then, molding a locating/retention feature of an elastomeric material about the projection.

A gasket assembly constructed in accordance with the invention overcomes the drawbacks discussed above with regards to FIGS. 1A-1C. In particular, a gasket constructed in accordance with the invention prevent deformations as described and shown in FIGS. 1B-1C. Accordingly, a gasket constructed in accordance with the invention does not distort under a vertical force as shown in FIG. 1B, nor does it distort under a lateral force as shown in FIG. 1C. As such, the distortion problems associated with the prior art gasket shown in FIG. 1A, which cause failure modes associated to the retention and location function are overcome by a gasket constructed in accordance with the invention. In accordance with one aspect of the invention, a stiff, rigid metal projection formed as one piece with the gasket body prevents vertical and lateral distortion to the locating/retention feature under respective vertical and lateral loads. In accordance with another aspect of the invention, the elastomeric locating/retention feature is prevented from distorting as shown in FIGS. 1B-1C via a reduced size through opening underlying the elastomeric material, which prevents the elastomeric material from being pushed through the through opening.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIGS. 6-9 illustrate partial cross-sectional views of a gasket assembly constructed in accordance with further aspects of the invention taken generally along a similar line as shown in FIG. 5.

DETAILED DESCRIPTION OF PRESENTLY PREFERRED EMBODIMENTS

Figure 2:
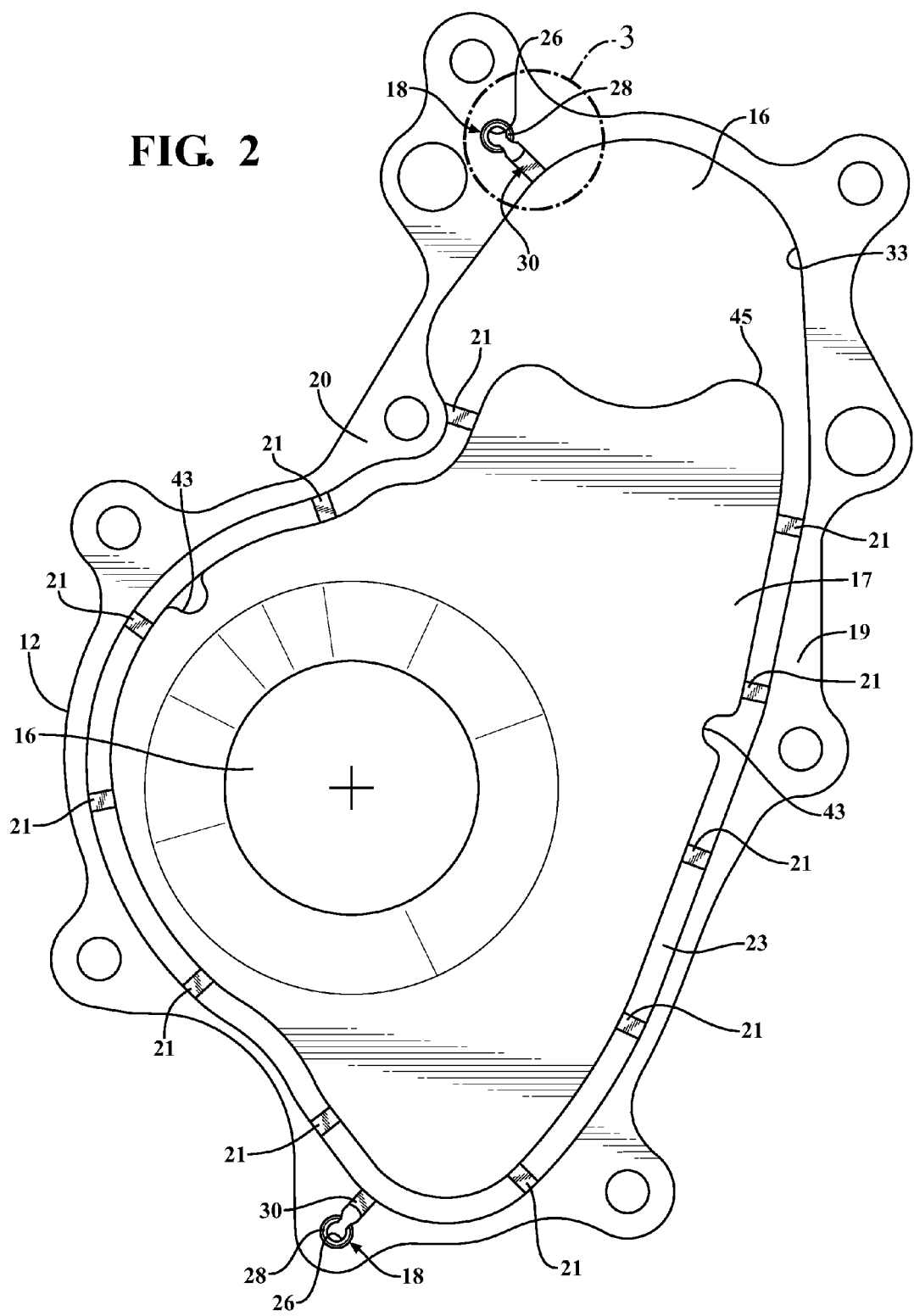
FIG. 2 is a plan view of a carrier body of a gasket assembly constructed in accordance with one aspect of the invention
Figure 2A:
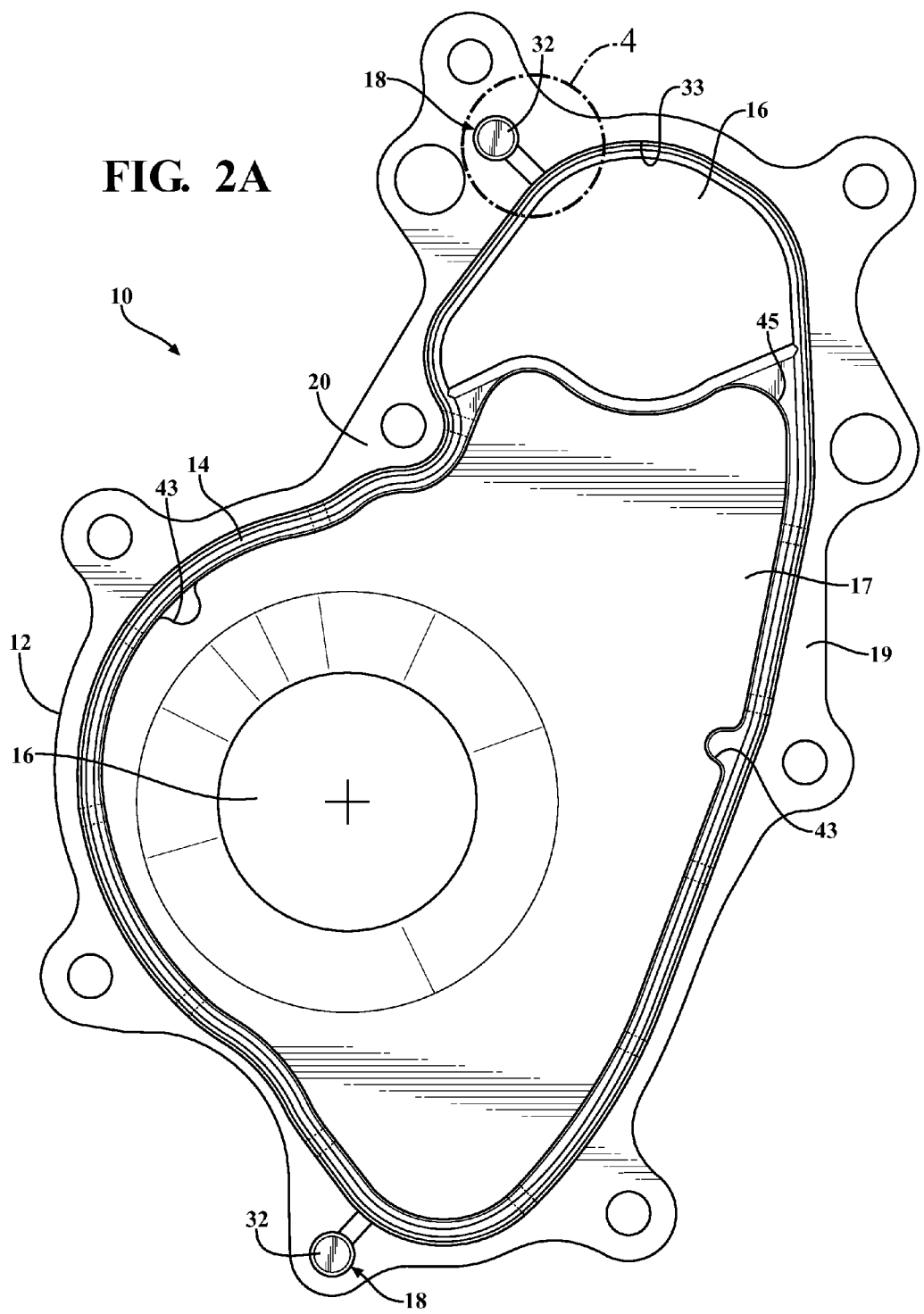
FIG. 2A is a plan view of a gasket assembly including the carrier body of FIG. 2.

Referring in more detail to the drawings, FIG. 2A illustrates a gasket assembly 10 constructed in accordance with one aspect of the invention. The gasket assembly 10, by way of example and without limitation, is represented as a water pump gasket, wherein the gasket 10 is clamped between a pair of members to be sealed, e.g. water pump housing and cover. The gasket 10 has at least one metal gasket body, also referred to as layer, and referred to here after as carrier layer or carrier body 12 (FIG. 2), with at least one elastomeric sealing bead 14 attached in bonded relation thereto. The sealing bead 14 is configured to form a fluid tight seal about one or more media-conveying openings 16. To ensure a reliable, fluid tight seal is established, the carrier body 12 is configured to prevent over compression of the sealing bead 14, such as by having regions with a controlled thickness. To further facilitate forming a reliable fluid tight seal, the gasket assembly 10 has at least one, and preferably a plurality of locating/retention features, referred to hereafter as features 18. The features 18 act to both locate and retain the gasket assembly 10 in a precise location relative to at least one of the members being clamped together, thereby providing added assurance that the gasket assembly 10 is properly positioned between the members both during and upon completing assembly, thus forming a reliable fluid-tight seal between the clamped members.

Figure 3:
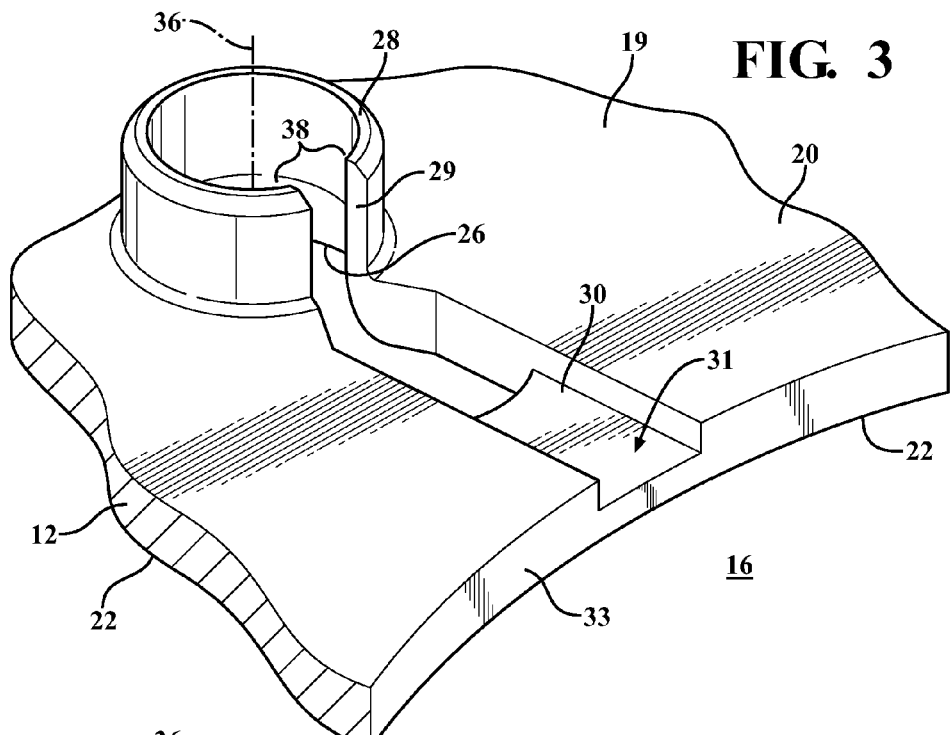
FIG. 3 is a partial perspective view of the carrier body taken generally from the encircled area 3 of FIG. 2.
Figure 4:
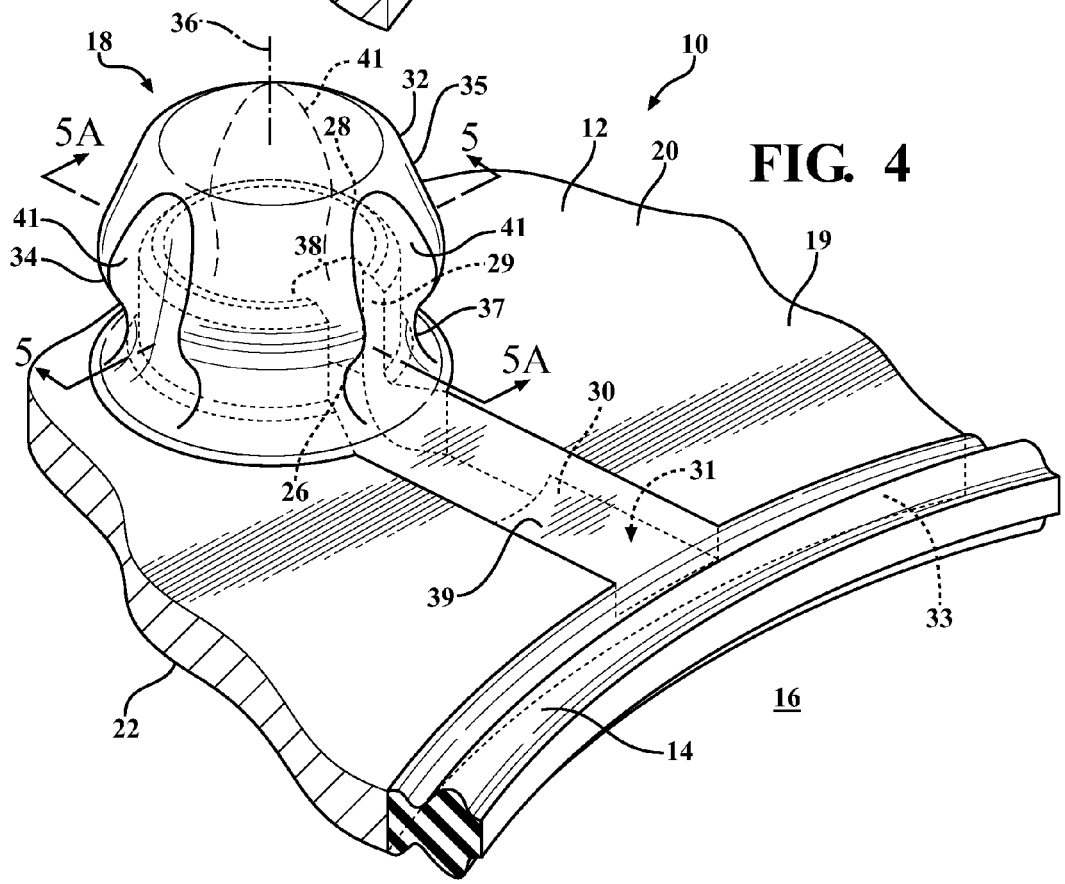
FIG. 4 is a partial perspective view of the gasket assembly taken generally from the encircled area 4 of FIG. 2A.

As shown in FIG. 2, the carrier body 12 has an annular inner portion 17 and an annular outer portion 19 spaced from one another by an annular gap extending circumferentially between the portions 17, 19. The inner portion 17 is fixed to the outer portion by a plurality of bridges 21 extending across the annular gap 23, wherein the inner portion 17, outer portion 19 and bridges 21 are formed of a monolithic, single piece of material. As shown in FIG. 3, the outer portion 19 has a pair of opposite upper and lower planar sealing surfaces, referred to hereafter as planar surfaces 20, 22. The inner and outer portions 17, 19 bound at least one media-conveying opening 16, wherein the media-conveying opening extends through the carrier body 12. One of the media conveying openings 16 is shown as being bounded by a portion of the inner portion 17 and a portion of the outer portion 19, such as to form an inlet media-conveying opening, while another media conveying opening 16 is shown as being formed in and bounded entirely in the inner portion 17, such as to form an outlet opening in which an impeller of a water pump is received, for example.

To provide the feature or features 18, the carrier body 12 has through openings 26 corresponding in number to the features 18, wherein the through openings 26 are shown as being formed in the outer portion 19 and spaced radially outwardly from the inner portion 17 and the media-conveying openings 16. Upon forming the through openings 26, an upstanding, rigid projection 28 is automatically formed from the upset material of the carrier body 12, wherein the projection 28 extends from the through opening 26 outwardly and generally transversely from one of the planar surfaces, shown here by way of example as being the upper surface 20. The projection 28 is formed having a semi-annular, and shown by way of example as a semi-cylindrical wall 29. The term "semi" in intended to mean partial and not necessarily half, though it could be half, and is shown as extending between about 200-270 degrees, although the range could be slightly greater or slightly less. The wall 29 extends upwardly from the surface 20 a predetermined height (h) (FIG. 5) such that upon assembly, the projection 28 does not interfere with the member in which it is received.

To facilitate forming a portion of the locating/retention features 18 and the sealing bead 14, the outer portion 19 of the carrier body 12 is constructed having a recessed channel 30 in at least one of the opposite planar surfaces 20, 22, wherein the recessed channel 30 is shown here as being formed in the upper surface 20 and extending partially through the thickness of the carrier body 12. Accordingly, the recessed channel 30 has a floor or bottom surface 31 raised above the lower planar surface 22 such that the floor 31 provides an intermediate planar surface extending generally parallel to the upper and lower planar surface 20, 22 between the planar surfaces 20, 22. The recessed channel 30 is constructed, such as in a coin operation, by way of example and without limitation, extending between an inner periphery 33 of the outer portion 19 and the through opening 26, and is shown in one location as extending from the inlet media conveying opening 16 to the through opening 26, and in another location as extending between the gap 23 and the through opening 26. The recessed channel 30 provides a conduit or flow path for elastomeric material used in construction of an outer elastomeric portion 32 of the feature 18 and the sealing bead 14. Accordingly, depending on the flow rate desired, such as in a injection molding process, the channel or channels 30 can be sized, i.e. depth and width, as desired.

Figure 1A:
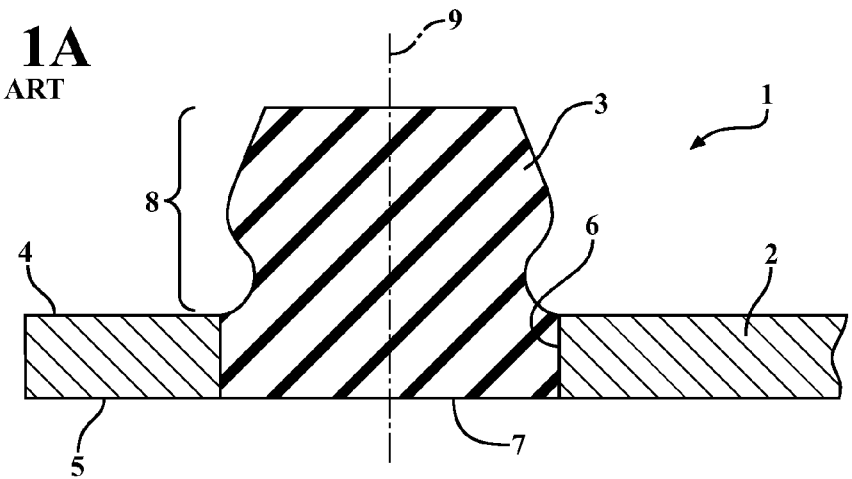
FIGS. 1A-1C illustrate a partially cross-sectional view of a gasket assembly constructed in accordance the prior art.
Figure 1B:
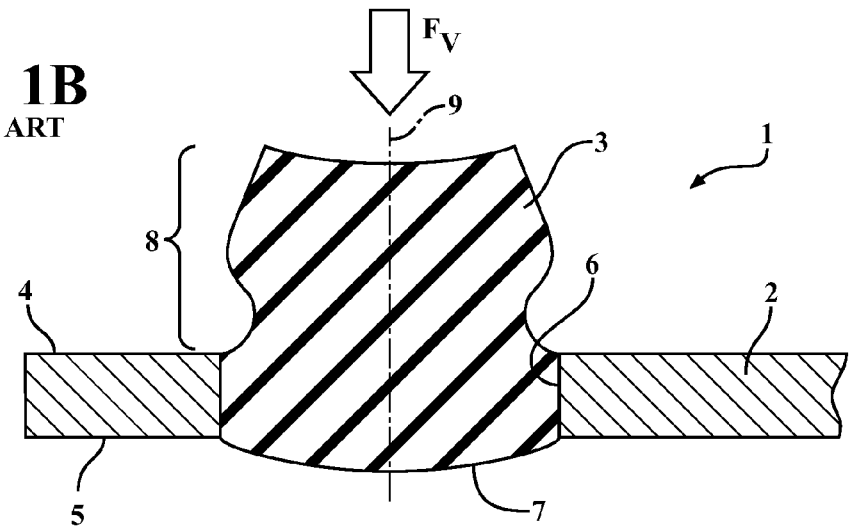
Figure 1C:
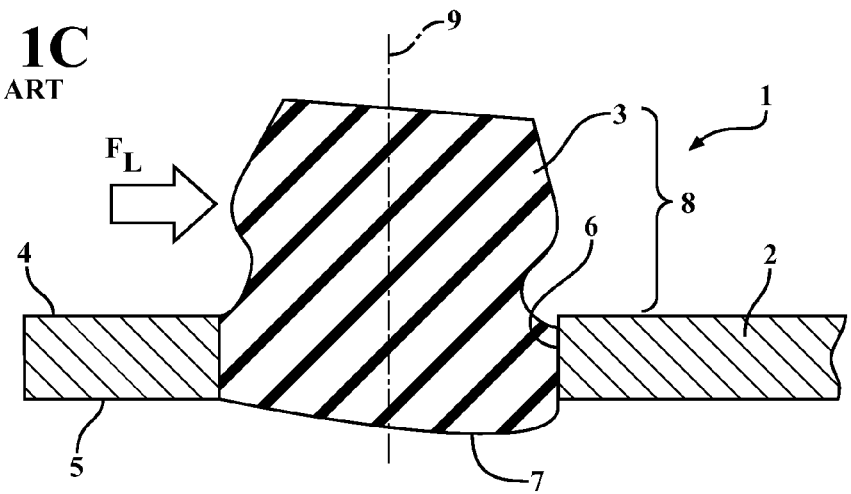

Each feature 18 is constructed of both the stiff metal projection 28 and the outer elastomeric portion 32. The metal projection 28 provides a desired degree of strength and rigidity to the feature 18, along with facilitating location, thereby preventing the type of distortion shown in FIGS. 1B-1C, while the outer elastomeric portion 32 provides the desired precision locating and retention aspects to locate and retain the gasket assembly 10 to the respective attached member. To further enhance the strength and rigidity of the projection 28, a predetermined amount of crush strength is provided via the arcuate, semi-annular geometry of the projection wall 29. In contrast, if the projection wall 29 were a substantially flat wall or tang, it would not have as great of strength and rigidity against being deformed or otherwise inadvertently bent from its "as manufactured" upstanding configuration.

Figure 5:
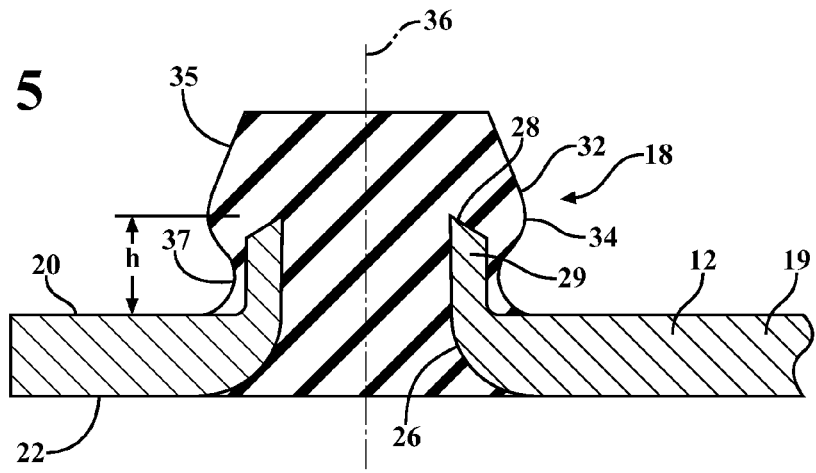
FIG. 5 is a cross-sectional view of the gasket assembly taken generally along the line 5-5 of FIG. 4.
Figure 5A:
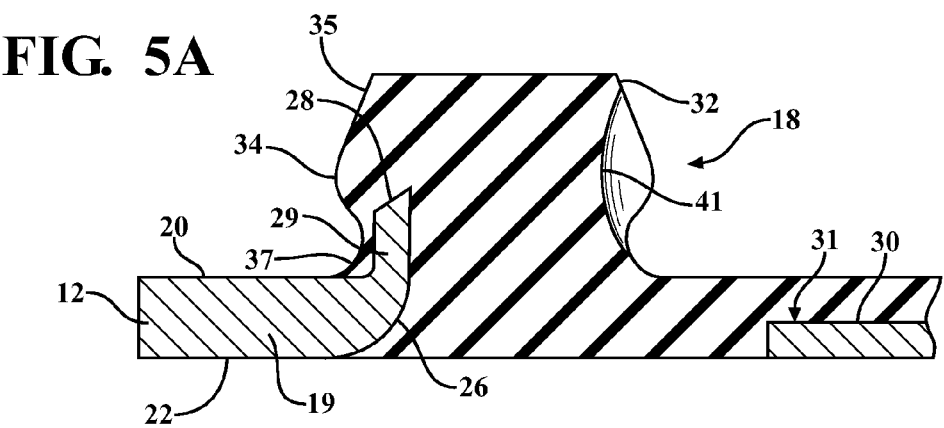
FIG. 5A is a cross-sectional view of the gasket assembly taken generally along the line 5A-5A of FIG. 4.

As indicated above, to facilitate attachment and retention of the gasket assembly 10 to the one of the members (not shown) being clamped together, the elastomeric portion 32 is formed about the projection 28, such as in a molding process, wherein the projection 28 is completely or substantially encapsulated within the elastomeric portion 32. As best shown in FIG. 5, the elastomeric portion 32 extends and transitions smoothly from the projection wall 29 into a flush or substantially flush relation with the upper surface 20 of the carrier body 12. The elastomeric portion 32 is configured, in its "as molded" configuration, to be retained within a predetermined size pocket of one of the members being clamped together. In addition, to further facilitate retention, the elastomeric portion 32 preferably has an annular bulbous region 34 that is sized for a line-to-line or slight interference fit within the pocket of the member. The bulbous region 34 is shown extending radially outwardly between an upper, radially inwardly tapered region 35 and a lower radially inwardly extending valley 37. As such, during assembly, the tapered region 35 facilitate initial entry of the feature 18 into the respective pocket of the member, while the valley 37 allows the elastomer material to flow axially as needed during interference of the bulbous region 34 with the wall of the pocket or receptacle. In addition, to facilitate assembly, the bulbous region 34 is formed having at least one, and shown as a plurality of scallops (three equally spaced scallops), also referred to as recessed sectors 41 to allow air to readily evacuate the respective pocket or receptacle upon being disposed therein. If not for the recessed sectors 41, a pressure build up of compressed air between the bulbous region 34 and the pocket could prevent the gasket from being properly positioned during assembly.

In manufacture, the carrier body 12, having had the through opening 26 and projection 28 already formed therein, is disposed in a mold cavity with a mold injection sprue or sprues of the mold machine extending upwardly in generally coaxial alignment with a central axis 36 of each of the through openings 26. Additional injection sprues can be incorporated as desired to provide the needed flow of elastomeric material. For example, the gasket body 12 can be formed having additional injection points, such as shown by recesses 43 in the inner portion 17, for example. The mold cavity is formed having the desired negative shape of the elastomeric portion 32 to be formed about the projection 28. As the melted elastomeric material is injected through the through openings 26, it is caused to flow through the channel 30, whereupon it flows through the annular gap 23 to form the seal bead 14 located between the inner portion 17 and the outer portion 19 and about the outer periphery 45 of the inner portion 17 to form in part the seal bead 14 about the inlet opening 16, which is also formed in part by elastomeric material bonded to the inner periphery 33 of the outer portion 19. Accordingly, upon completing the molding process, the elastomeric portions 32 and the seal bead 14 are connected as a continuous, monolithic piece of the elastomeric material via a bridge 39 of the elastomeric material. It should be recognized that the sealing bead 14 can be formed having any suitable geometry, depending on the application. Desirably, the sealing bead 14 has a portion extending outwardly beyond the opposite surfaces 20, 22 (above the upper surface 20 and below the lower surface 22), such that upon clamping the members into abutment with the carrier body 12, the sealing bead 14 is caused to elastically deform into sealed abutment with sealing surfaces of the members being clamped together.

In constructing the gasket assembly 10, the substantially flat carrier body 12 is cut to shape, thereby being provided with the desire media-conveying openings 16 and through openings 26, such as in a stamping operation, for example. The channels 30 can then be formed, such as in a coining operation, though other machining operations could be used, e.g. milling. The projections 28 are also formed, such as by being drawn from the material immediately adjacent the through openings 26, wherein the drawing can be performed in a progressive drawing process. As such, the thickness of the walls forming the projections 28 is reduced from the material thickness extending between the opposite surfaces 20, 22 of the carrier body 12. The formed carrier body 12 is then placed in the mold cavity, wherein the elastomeric material is injected through the mold injection sprue upwardly into the semi-cylindrical projection 28. With the semi-annular projection having an opening, also referred to as slot 38, aligned with and facing the channel 30 in open fluid communication therewith, and further, with the remaining portion of the projection being enclosed by the walls of the mold cavity, the elastomeric material is forced under pressure to fill the mold cavity, thereby causing the elastomeric material to flow completely about the projection 28. As such, the projection 28 is encapsulated by the elastomeric material. At the same time, the elastomeric material is caused to flow under pressure through the channel 30 and about an inner periphery of the media-conveying opening 16, thereby forming the sealing bead 14 as a single, monolithic piece of material with the elastomeric portion 32 of the locating/retention feature 18.

FIGS. 6-9 show portions of respective gasket assemblies 110, 210, 310, 410 constructed in accordance with other embodiments of the invention in views similar to FIG. 5, wherein reference numerals offset by a factor of 100, 200, 300, and 400, respectively, are used to identify like features as discussed above.

Figure 6:
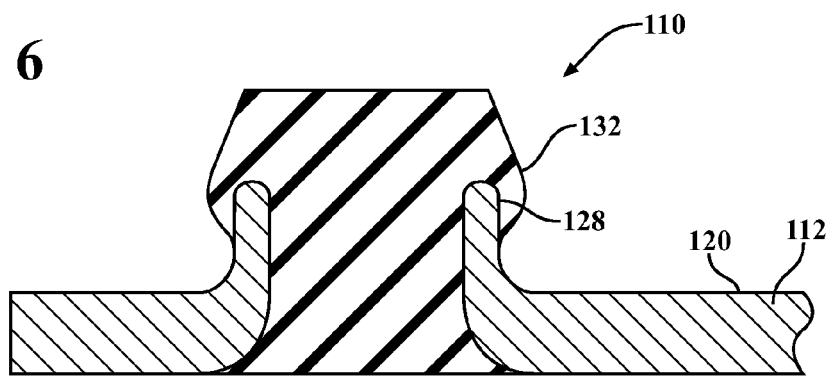

In FIG. 6, the gasket assembly 110 is shown being constructed similarly as discussed with regard to the assembly 10, however, an elastomeric portion 132 substantially encapsulating a projection 128 terminates on an outer portion of the projection 128 and thus, does not flow into a smooth, flush transition with a planar surface 120 of a carrier body 112, but remains spaced axially above the planar surface 120. Accordingly, differences in the mold cavity are needed to attain the structure shown in FIG. 6. Otherwise, the gasket assembly 110 is substantially the same, and thus, is not discussed further.

In FIG. 7, the gasket assembly 210 is shown being constructed differently from the assembly 10 in that there is no projection formed on a carrier 212 of the assembly 210. Rather, a locating/retention feature 218 is formed entirely of an elastomeric material in a molding process. As such, to prevent the problems discussed with regard to the prior art of FIGS. 1A-1C, the carrier body 212 has a through opening 226 with a substantially smaller diameter than the diameter of the elastomeric locating/retention feature 218. Further, the carrier body 212 has an annular recessed surface 40 extending about the through opening 226, wherein the recessed surface 40 can be formed in a coining process, by way of example and without limitation. Accordingly, the desired size of the through opening 226 is finalized upon upsetting the metal material of the gasket body 212 in the coining process. Otherwise, if the recessed surface 40 is formed in a machining process, for example, then the through opening 226 can be punched to size, as the finished size of the through opening 226 will not change upon being punched, or otherwise formed, e.g. drilled. With the through opening 226 being substantially reduced in diameter from the overlying elastomeric locating/retention feature 218, an applied vertical force component $F_L$ and lateral force component $F_L$ do not cause the elastomeric material to be pushed downwardly through the through opening 226. During molding, the elastomeric locating/retention feature 218 attains the same external configuration as discussed with regard to the assembly 10, wherein the elastomeric material transitions smoothly in flush transition with a planar surface 220 of the carrier body 212. However, unlike the assembly 10, the elastomeric material fills the recessed surface 40, wherein the recessed surface 40 acts to absorb vertically and laterally applied forces to the locating/retention feature 218. Accordingly, the reduced diameter through opening 226 and the recessed surface 40 prevent the type of distortion shown in FIGS. 1B-1C from occurring. Otherwise, the gasket assembly 210 is substantially the same, and thus, is not discussed further.

In FIG. 8, the gasket assembly 310 is shown having a carrier body 312 with opposite planar surfaces 320, 322. A locating/retention feature 318 is formed in part from an upstanding projection 328 formed from the metal material of the carrier body 312 and in part from an elastomeric portion 332 formed of an elastomeric material. The upstanding projection 328 is formed having a through opening, also referred to as though passage 326, extending therethrough, through which the elastomeric material flows while molding the elastomeric portion 332. The projection 328, rather than having a cylindrical configuration as discussed with the embodiments shown in FIGS. 2-6, is generally cup or bowl-shaped, having an upper plateau surface 42 through which the through passage 326 is formed. The elastomeric portion 332 is bonded to the projection 328 and extends upwardly from the plateau surface 42 away from the upper surface 320 and also fills the through opening 326 and also a concave region 44 establish immediately beneath the plateau surface 42, with the through opening 326 providing a flow path for the melted elastomeric material therebetween during manufacture. Accordingly, the plateau surface 42 acts as a barrier to the potential downward pushing movement of the elastomeric portion 332 from a vertical force, while the projection 328 acts as a barrier to lateral movement of the elastomeric portion 332 from a lateral force, thus, preventing the locating/retention feature 318 from undergoing the type of distortion shown in FIGS. 1B-1C. Otherwise, the gasket assembly is substantially the same, and thus, is not discussed further.

In FIG. 9, the gasket assembly 410 is shown having a carrier body 412 with opposite planar surfaces 420, 422 with a locating/retention feature 418 formed entirely of an elastomeric material, such as in a molding process. The carrier body 412 has an annular recessed surface 46 extending upwardly into the lower planar surface 422 with a through opening 426 extending through the recessed surface 46 through the upper planar surface 420. The elastomeric locating/retention feature 418 is molded such that the elastomeric material fills the recessed surface 46 in substantially coplanar relation with the lower surface 422 and extends upwardly through the through opening 426. The feature 418 is provided with an outer periphery having annular stepped retention rings 48, shaped similarly to a Christmas tree, for example. The retention rings 48 are configured for receipt in a female pocket 50 of an overlying member 52 to be clamped. Accordingly, upon the location/retention feature 418 being disposed in the pocket 50, the gasket assembly 410 is maintained in its proper position relative to the member 52.

Obviously, many modifications and variations of the present invention are possible in light of the above teachings. It is, therefore, to be understood that within the scope of the appended claims, the invention may be practiced otherwise than as specifically described.

What is claimed is:

1. A gasket assembly, comprising:
 a carrier body having opposite planar surfaces with at least one media-conveying opening extending through said planar surfaces and having at least one through opening spaced radially from said at least one media-conveying opening;
 at least one projection formed of the material of said carrier body, said at least one projection extending from said at least one through opening outwardly from at least one of said planar surfaces, wherein said projection has a semi-annular wall;
 an elastomeric material encapsulating said projection; and
 said elastomeric material filling and closing said at least one through opening.

2. The gasket assembly of claim 1 further comprising at least one recessed channel in at least one of said opposite planar surfaces, said at least one recessed channel extending between said at least one media conveying opening and said at least one through opening.

3. The gasket assembly of claim 2 wherein said elastomeric material substantially fills said at least one recessed channel.

4. The gasket assembly of claim 3 further comprising a seal bead extending circumferentially about said at least one media-conveying opening, said seal bead being constructed as one piece of material with said elastomeric material.

5. The gasket assembly of claim 1 wherein said elastomeric material extends substantially flush with said at least one of said planar surfaces.

6. The gasket assembly of claim 1 wherein said carrier body has an annular inner portion and an annular outer portion spaced from one another by an annular gap, said inner portion being fixed to said outer portion by a plurality of bridges extending across said annular gap.

7. The gasket assembly of claim 6 further comprising at least one recessed channel in at least one of said opposite planar surfaces, said at least one recessed channel extending between said annular gap and said at least one through opening.

8. The gasket assembly of claim 7 wherein said at least one channel is formed in said annular outer portion.

9. The gasket assembly of claim 7 wherein said elastomeric material substantially fills said at least one recessed channel.

10. The gasket assembly of claim 9 further comprising a seal bead extending within said annular gap, said seal bead being constructed as one piece of material with said elastomeric material.

11. The gasket assembly of claim 10 wherein another one of said at least one recessed channel extends between said at least one media conveying opening and said at least one through opening.

12. The gasket assembly of claim 11 wherein said elastomeric material substantially fills said another one of said at least one recessed channel.

13. The gasket assembly of claim 12 further comprising another seal bead extending circumferentially about said at least one media-conveying opening, said another seal bead being constructed as one piece of material with said elastomeric material.

14. The gasket assembly of claim 1 wherein said semi-annular wall has a slot and further comprising at least one recessed channel in at least one of said opposite planar surfaces, said at least one recessed channel extending between said at least one media conveying opening and said slot.

15. The gasket assembly of claim 1 wherein said at least one projection extends outwardly from one of said opposite planar surfaces to an upper plateau spaced from said opposite planar surfaces with a through passage extending through said upper plateau.

16. The gasket assembly of claim 15 wherein said elastomeric material is bonded to said at least one projection, said elastomeric material extending upwardly from said plateau and through said through passage.

17. The gasket assembly of claim 16 wherein said projection provides a concave region immediately beneath said upper plateau and said elastomer fills said concave region.

* * * * *